United States Patent [19]

Kidwell et al.

[11] Patent Number: 5,029,945

[45] Date of Patent: Jul. 9, 1991

[54] VEHICULAR TRACTION WHEEL

[76] Inventors: Thomas E. Kidwell; Patricia A. Kidwell, both of 394 S. Street Rd., Galion, Ohio 44833

[21] Appl. No.: 564,111

[22] Filed: Aug. 8, 1990

[51] Int. Cl.$^5$ ............................................. B60B 15/12
[52] U.S. Cl. ....................................... 301/49; 301/48
[58] Field of Search ................... 301/41 R, 43, 45, 47, 301/48, 49

[56] References Cited

U.S. PATENT DOCUMENTS

| | | | |
|---|---|---|---|
| 1,149,305 | 8/1915 | Tautphaeus | 301/49 |
| 1,319,018 | 10/1919 | Oatsdean | 301/49 |
| 1,578,478 | 3/1926 | Spescha | 301/48 |
| 2,250,713 | 7/1941 | Johnson | 301/49 |

FOREIGN PATENT DOCUMENTS 1381815 1/1964 France .................... 301/48

Primary Examiner—Russell D. Stormer
Attorney, Agent, or Firm—Leon Gilden

[57] ABSTRACT

A traction device including a stationary plate mounted to a housing of an associated drive wheel of a vehicle, with a rotary member mounted rotatably relative to the stationary plate, with spike members mounted relative to the rotary portion extensible upon actuation of an arcuate actuator plate extensible to effect contact, with contact head portions of each spike to effect radial projection of each spike. A medially positioned guide plate includes right and left cam surfaces to effect positioning of each contact head of each spike relative to the actuator plate.

1 Claim, 3 Drawing Sheets

VEHICULAR TRACTION WHEEL

BACKGROUND OF THE INVENTION

1. Field of the Invention

The field of invention relates to traction devices, and more particularly pertains to a new and improved vehicular traction wheel wherein the same utilizes selectively extensible spikes mounted relative to a vehicular wheel to effect enhanced traction of the wheel.

2. Description of the Prior Art

Various stabilizing and traction devices have been utilized in the prior art. Heretofore, however, such devices have been of relatively complex and elaborate construction limiting their use and application. Prior art devices may be found for example in U.S. Pat. No. 3,995,909 to van der Lely wherein an anti-skid mechanism is mounted to an exterior surface of the wheel utilizing plates and lugs that are radially extensible to effect ground engaging positions.

U.S. Pat. No. 2,041,460 to Donderer sets forth a tractor wheel wherein an interior cam plate is rotatable to effect selective extension of splice within the wheel.

U.S. Pat. No. 1,932,604 to Roberts sets forth a traction drive wheel utilizing piston and cylinder members to effect outward projections of spike portions relative to the wheel.

U.S. Pat. No. 3,207,562 to Ewing sets forth a further example of ground engaging lugs relative to an associated vehicular wheel structure.

U.S. Pat. No. 4,261,622 to Miller sets forth an automotive vehicular wheel for traveling about ice and snow, wherein the wheel includes spike members, wherein the spike members are extensible by a mechanical adjuster and stationary relative to the wheel during use.

As such, it may be appreciated that there continues to be a need for a new and improved vehicular traction wheel which addresses both the problems of ease of use as well as effectiveness in construction and in this respect, the present invention substantially fulfills this need.

SUMMARY OF THE INVENTION

In view of the foregoing disadvantages inherent in the known types of vehicular traction devices now present in the prior art, the present invention provides an vehicular traction wheel wherein the same utilizes a selectively extensible actuator ring mounted within a housing to selectively extend spikes relative to the wheel to effect enhanced traction of the wheel surface. As such, the general purpose of the present invention, which will be described subsequently in greater detail, is to provide a new and improved vehicular traction wheel which has all the advantages of the prior art vehicular traction devices and none of the disadvantages.

To attain this, the present invention provides a traction device including a stationary plate mounted to a housing of an associated drive wheel of a vehicle, with a rotary member mounted rotatably relative to the stationary plate, with spike members mounted relative to the rotary portion extensible upon actuation of an arcuate actuator plate extensible to effect contact, with contact head portions of each spike to effect radial projection of each spike. A medially positioned guide plate includes right and left cam surfaces to effect positioning of each contact head of each spike relative to the actuator plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular traction wheel which has all the advantages of the prior art vehicular traction devices and none of the disadvantages.

It is another object of the present invention to provide a new and improved vehicular traction wheel which may be easily and efficiently manufactured and marketed.

It is a further object of the present invention to provide a new and improved vehicular traction wheel which is of a durable and reliable construction.

An even further object of the present invention is to provide a new and improved vehicular traction wheel which is susceptible of a low cost of manufacture with regard to both materials and labor, and which accordingly is then susceptible of low prices of sale to the consuming public, thereby making such vehicular traction wheels economically available to the buying public.

Still yet another object of the present invention is to provide a new and improved vehicular traction wheel which provides in the apparatuses and methods of the prior art some of the advantages thereof, while simultaneously overcoming some of the disadvantages normally associated therewith.

Still another object of the present invention is to provide a new and improved vehicular traction wheel wherein the same utilizes an extensible arcuate actuator plate mounted within a housing to selectively extend spike members for enhanced traction of an associated vehicular wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
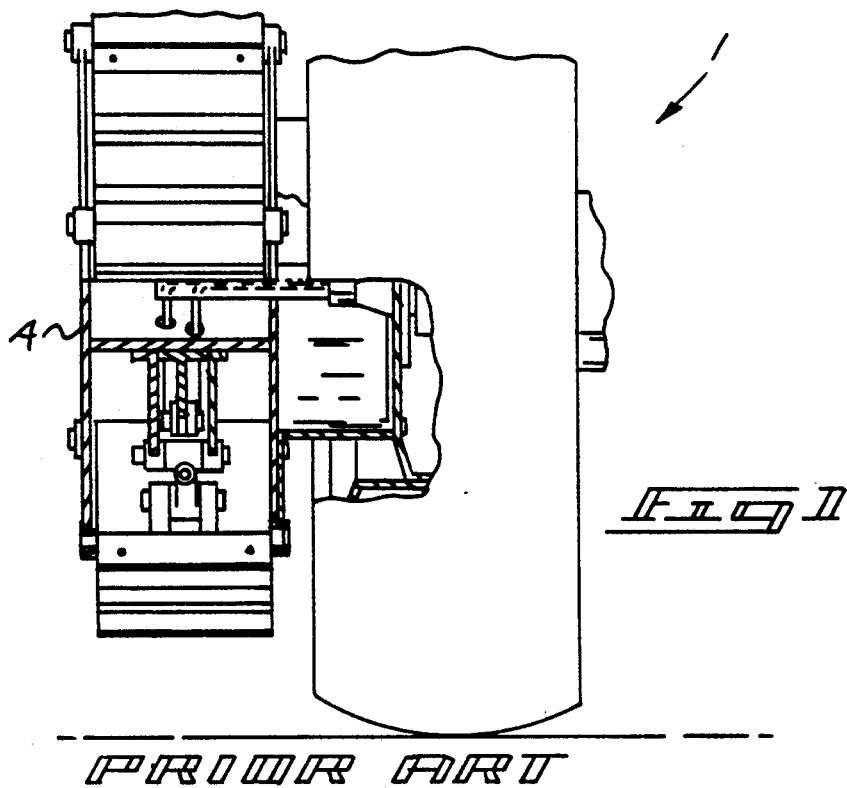
FIG. 1 is an orthographic side view of a prior art vehicular traction wheel device.
Figure 2:
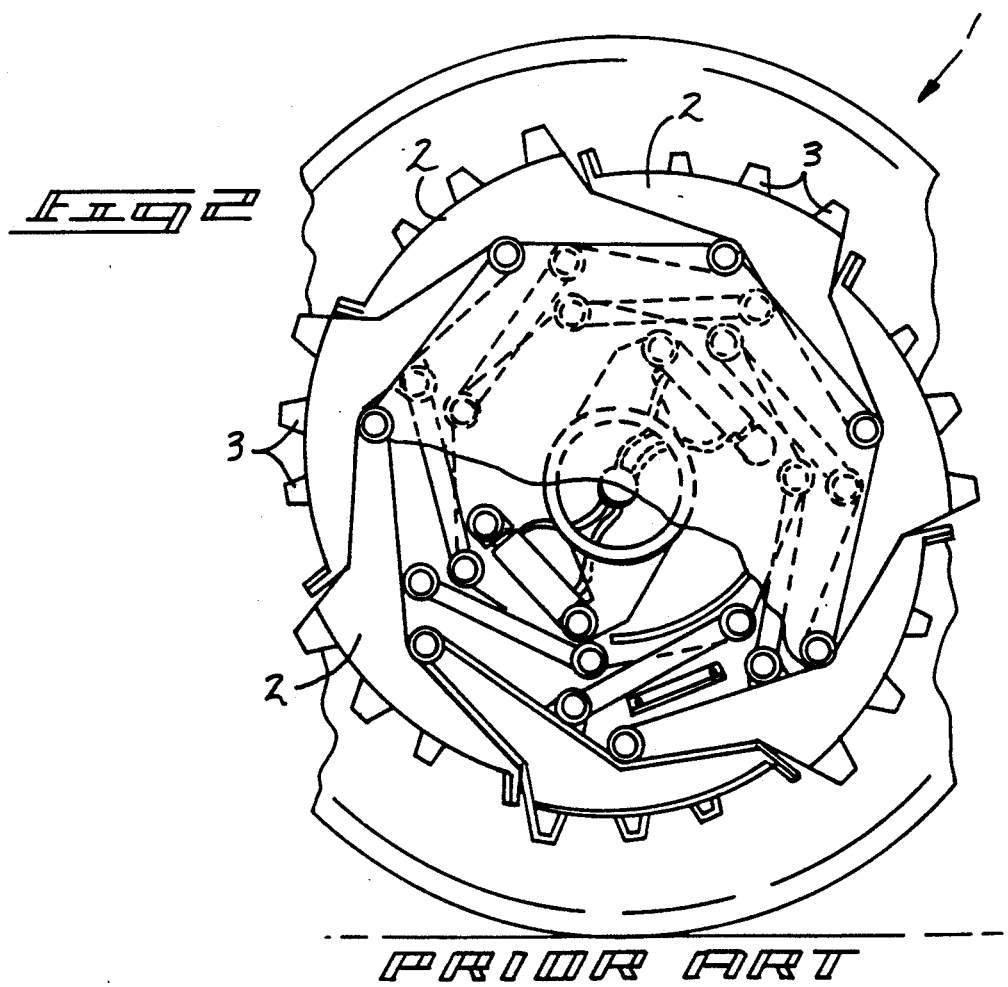
FIG. 2 is an orthographic end view, taken in elevation, of the vehicular tractor wheel as set forth in FIG. 1.
Figure 3:
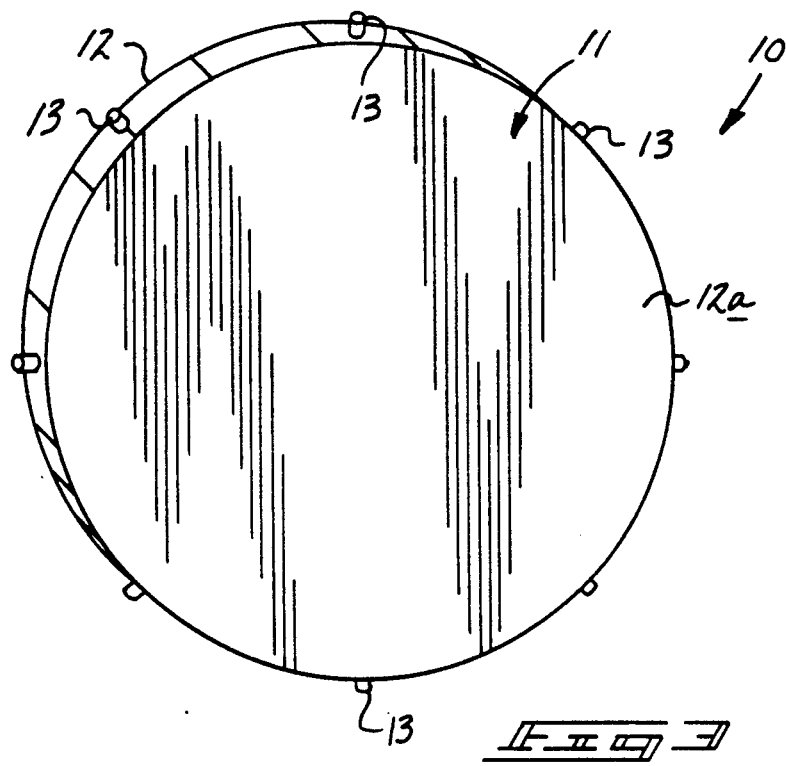
FIG. 3 is an isometric illustration of the instant invention.
Figure 4:
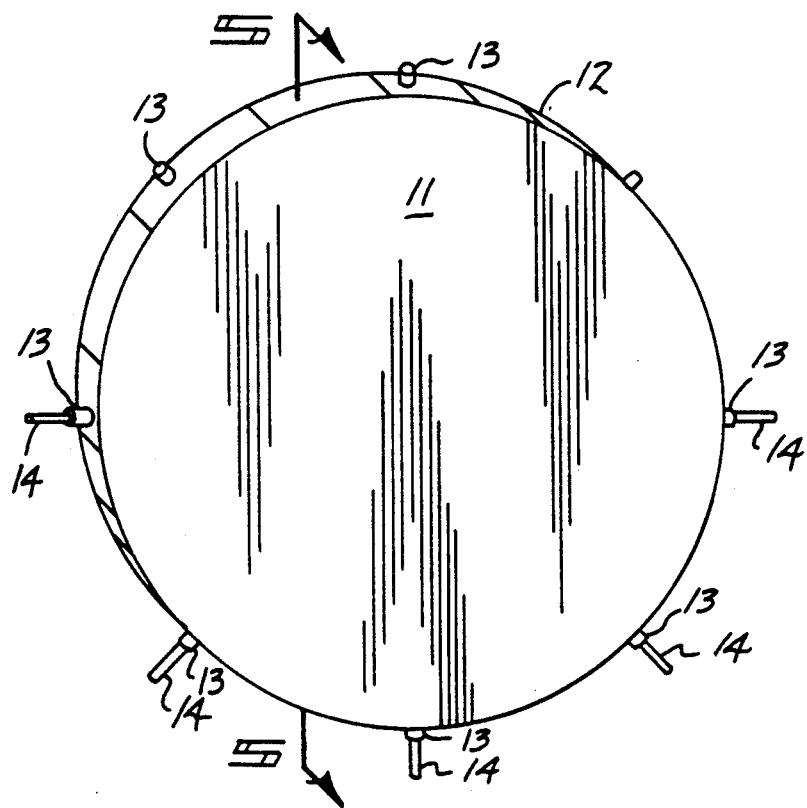
FIG. 4 is an isometric illustration of the instant invention with the spikes in an extended orientation relative to the wheel.
Figure 5:
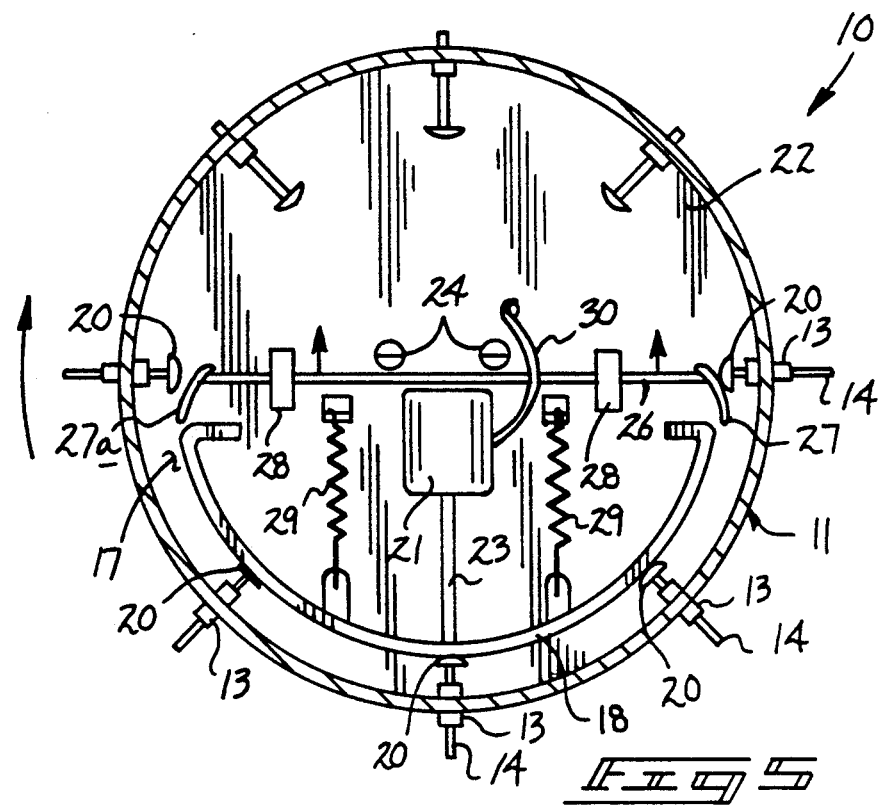
FIG. 5 is an orthographic cross-sectional illustration of the instant invention, taken along the lines 5—5 of FIG. 4 in the direction indicated by the arrows.

With reference now to the drawings, and in particular to FIGS. 1 to 6 thereof, a new and improved vehicular traction wheel embodying the principles and concepts of the present invention and generally designated by the reference numeral 10 will be described.

FIG. 1 illustrates a prior art traction wheel device 1, wherein a hub member 4 mounts a series of radially extensible plates 2 utilizing lugs 3 mounted thereon to permit arcuate extension of the plates and lugs relative to the wheel assembly to provide enhanced traction, in a manner as set forth by U.S. Pat. No. 3,995,909, utilizing hydraulic actuators removably actuated in a manner incorporated herein by reference.

Figure 6:
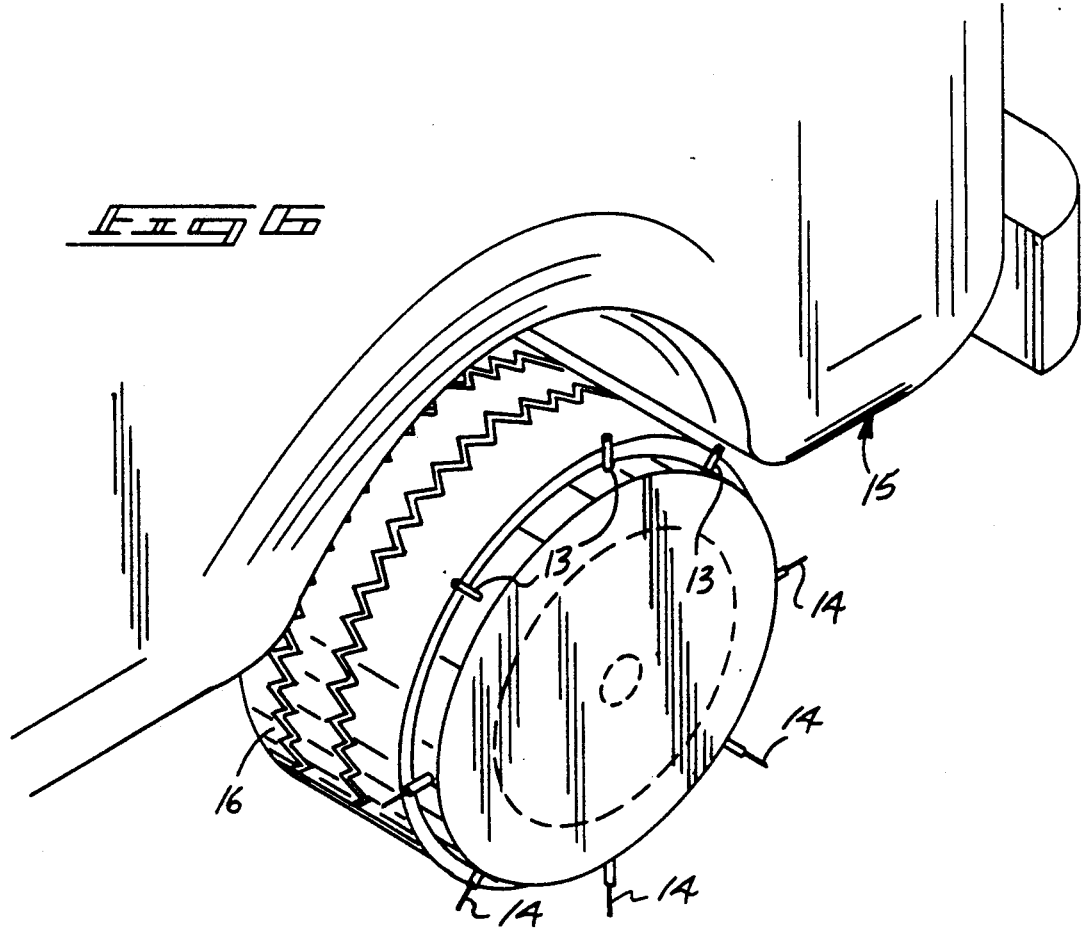
FIG. 6 is an isometric illustration of the invention mounted to a vehicular wheel.

More specifically, the vehicular traction wheel 10 of the instant invention essentially comprises a cylindrical housing 11, including a rotary annular side wall mounted to a front wall 12a that are rotatably mounted to an associated wheel rim of a vehicular wheel to rotate therewith, in a manner as set forth in FIG. 6. A stationary rear plate member 12 is mounted to an axle housing of the associated wheel utilizing fasteners 24. Cylindrical spike bodies 13 arranged in equally spaced annular array about the annular side wall include spike members 14 reciprocatably mounted therewithin. Each spike member includes a forward free terminal end and interior, and including an arcuate contact head 20 fixedly mounted thereto. The vehicle 15 mounts the assembly relative to the vehicle wheel 16, as illustrated in FIG. 6. The cylindrical body 11 includes a cylindrical chamber 17, with an arcuate actuator 18 including a forward piston positioned and bisecting the actuator and reciprocatably mounted to a hydraulic actuator member 21, including a hydraulic line 30 operatably associated to a hydraulic pressure source, in a manner as typified in the aforenoted U.S. Pat. No. 3,995,909. An actuator member 21 is fixedly mounted to the stationary plate member 22 to reciprocatingly and selectively extend the associated forward piston 23 to effect extension of the spike members 14 upon their rotation into contact with the actuator plate 18 that employs a forward guide surface to permit guiding of the arcuate contact heads 20 therealong. A fixedly mounted medial guide plate 26 is diametrically and horizontally aligned within the stationary plate member 22 and includes a respective right and left actuator plate cam end member 27. The cam end members deflect the relatively passing arcuate contact heads 20 to align them with the actuator plate 18 during their rotation past the actuator plate. The guide plate 26 is mounted to the stationary plate member by mounting plates 28. The arcuate actuator plate 18 is normally biased to a retracted position by the spaced return springs that are arranged parallel relative to the forward piston 23, with forward ends of the return springs 29 mounted to an interior surface of the arcuate actuator plate 18 and rear terminal ends of the springs mounted to the stationary plate 22.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and mannner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular traction wheel comprising, in combination, a cylindrical body, the cylindrical body including a stationary plate member and a relatively rotatably annular side wall, and the annular side wall including an annular array of equally spaced spike bodies, each spike body including an extensible and retractable spike member directed and positioned reciprocatably within each spike body, a rear terminal end of each spike member includes an arcuate contact head orthogonally and coaxially mounted to the rear terminal end of each spike member, and an arcuate actuator plate reciprocatably mounted relative to the stationary plate to effect extension of the spike members when each spike member and contact head is directed by the arcuate actuator plate means when the arcuate actuator plate means is in an extended orientation, and wherein the arcuate actuator plate includes a piston, the piston mounted to a rear surface of the arcuate actuator plate, and the piston reciprocatably mounted relative to an actuator member, the actuator member fixedly mounted to the stationary plate, and hydraulic means to selectively effect reciprocation of the piston relative to the actuator member, and including a plurality of return springs, a forward end of each return spring mounted to the rear surface of the actuator plate, and a rear terminal end of each spring fixedly mounted to the stationary plate, and wherein the stationary plate includes a diametrically aligned medial guide plate, the medial guide plate including a right and left cam plate end member mounted to each respective right and left terminal end of the guide plate, and each respective right and left cam member positioned adjacent a right and left rear terminal end of the actuator plate to effect guidance of each contact head relative to the actuator plate.

* * * * *